(12) United States Patent
Kobayashi et al.

(10) Patent No.: US 8,034,733 B2
(45) Date of Patent: Oct. 11, 2011

(54) OPTICAL GLASS, OPTICAL ELEMENT AND METHOD OF MANUFACTURING THEREOF

(75) Inventors: Yuta Kobayashi, Kanagawa (JP); Yoichi Hachitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 171 days.

(21) Appl. No.: 11/723,467

(22) Filed: Mar. 20, 2007

(65) Prior Publication Data

US 2007/0249480 A1 Oct. 25, 2007

(30) Foreign Application Priority Data

Mar. 22, 2006 (JP) ................................ 2006-079206

(51) Int. Cl.
*C03C 3/066* (2006.01)
*C03C 3/068* (2006.01)

(52) U.S. Cl. ............... 501/79; 501/50; 501/51; 501/78; 65/64

(58) Field of Classification Search .................... 501/78, 501/79, 50, 51; 65/64
See application file for complete search history.

(56) References Cited

U.S. PATENT DOCUMENTS

| | | | | |
|---|---|---|---|---|
| 4,128,432 A * | 12/1978 | Komorita et al. | ............... | 501/42 |
| 4,390,638 A * | 6/1983 | Mennemann et al. | ........... | 501/77 |
| 4,481,299 A * | 11/1984 | Tajima | ............................ | 501/73 |
| 4,612,295 A * | 9/1986 | Sagara | ............................ | 501/51 |
| 4,732,876 A * | 3/1988 | Nagamine et al. | ............... | 501/78 |
| 4,742,028 A * | 5/1988 | Boudot et al. | .................. | 501/78 |
| 6,187,702 B1 * | 2/2001 | Morishita | ....................... | 501/78 |
| 6,333,288 B1 * | 12/2001 | Clement et al. | ................. | 501/78 |
| 6,413,894 B1 * | 7/2002 | Sato | ................................ | 501/77 |
| 6,797,659 B2 * | 9/2004 | Uehara | ........................... | 501/78 |
| 6,912,093 B2 * | 6/2005 | Endo | .............................. | 359/642 |
| 7,232,779 B2 | 6/2007 | Kasuga et al. | | |
| 7,490,485 B2 | 2/2009 | Endo | | |
| 7,491,667 B2 * | 2/2009 | Hayashi | .......................... | 501/51 |
| 2003/0022782 A1 * | 1/2003 | Uehara | ........................... | 501/78 |
| 2004/0106507 A1 | 6/2004 | Kasuga et al. | | |
| 2004/0145815 A1 * | 7/2004 | Endo | .............................. | 359/642 |
| 2004/0186003 A1 * | 9/2004 | Uehara | ........................... | 501/78 |
| 2004/0220041 A1 | 11/2004 | Isowaki et al. | | |
| 2005/0107240 A1 * | 5/2005 | Uehara | ........................... | 501/78 |
| 2005/0204776 A1 * | 9/2005 | Hayashi | .......................... | 65/102 |
| 2005/0209085 A1 | 9/2005 | Endo | | |
| 2006/0105900 A1 * | 5/2006 | Kasuga et al. | .................. | 501/78 |
| 2006/0189473 A1 * | 8/2006 | Endo | .............................. | 501/78 |
| 2006/0247119 A1 * | 11/2006 | Ritter et al. | ..................... | 501/78 |
| 2007/0049483 A1 * | 3/2007 | Hayashi | .......................... | 501/78 |
| 2008/0194395 A1 | 8/2008 | Endo | | |

FOREIGN PATENT DOCUMENTS

| | | | |
|---|---|---|---|
| EP | 0992461 A1 | | 4/2000 |
| JP | 50053413 A | * | 5/1975 |
| JP | 56078447 A | * | 6/1981 |
| JP | 56164033 A | * | 12/1981 |
| JP | 57038342 A | * | 3/1982 |
| JP | 59-050048 A | | 3/1984 |
| JP | 60-021828 A | | 2/1985 |
| JP | 60033229 A | * | 2/1985 |
| JP | 62-100449 A | | 5/1987 |
| JP | 62100449 A | * | 5/1987 |
| JP | 62-132741 A | | 6/1987 |
| JP | 01308843 A | * | 12/1989 |
| JP | 2000344542 A | | 12/2000 |
| JP | 2004099428 A | | 4/2004 |
| JP | 2004175632 A | | 6/2004 |
| JP | 2005047732 A | | 2/2005 |
| JP | 2005330154 A | | 2/2005 |
| JP | 2005179142 A | | 7/2005 |
| JP | 2006111482 A | * | 4/2006 |

OTHER PUBLICATIONS

German Office Action dated Nov. 5, 2008.
Japanese Office Action corresponding to JP Patent Application No. 2006-079206. dated Feb. 23. 2010.
Chinese Office Action corresponding to Chinese Patent Application No. 200710088262.8, dated Aug. 23, 2010.
Changxu Shi, Handbook of Material Science and Engineering, Chapter 11, Special function material, Chemical Industry Press, p. 8, Jan. 2004. English translation.
Handbook of Aerial Manufacture Engineering-Volume of optical element processing. Board Committee Press of Aerial Industry, pp. 94-95, 1993. English translation.

* cited by examiner

*Primary Examiner* — Karl Group
*Assistant Examiner* — Elizabeth A Bolden
(74) *Attorney, Agent, or Firm* — Sughrue Mion, PLLC

(57) ABSTRACT

An optical glass comprises, denoted as weight percentages, $SiO_2$-2-22%, $B_2O_3$: 3-24%, ZnO:>8% and ≤30%, CaO+BaO+ZnO: 10-50%, MgO: 0-3%, $La_2O_3+Y_2O_3+Gd_2O_3+Yb_2O_3$: 1-33%, $TiO_2$: 2-20%, $ZrO_2$: 0-10%, $Nb_2O_5$: 2-32%, $Li_2O$: 0-5%, $Na_2O$: 0-8%, $K_2O$: 0-10%, $WO_3$: 0-20%. The ratio by weight of $La_2O_3$ to the combined contents of $La_2O_3$, $Y_2O_3$, $Gd_2O_3$, and $Yb_2O_3$ ($La_2O_3/(La_2O_3+Y_2O_3+Gd_2O_3+Yb_2O_3)$) falls within a range of 0.7 to 1.

6 Claims, No Drawings

OPTICAL GLASS, OPTICAL ELEMENT AND METHOD OF MANUFACTURING THEREOF

CROSS-REFERENCE TO RELATED APPLICATIONS

This application claims benefit of priority under 35 USC 119 to Japanese Patent Application No. 2006-79206 filed on Mar. 22, 2006, which is expressly incorporated herein by reference in its entirety.

BACKGROUND OF THE INVENTION

1. Field of the Invention

The present invention relates to glass having a high refractive index that is suited to use in the lenses employed in cameras and projectors. The present invention further relates to optical elements made from this glass and to a method for manufacturing such optical elements.

2. Discussion of the Background

Highly refractive glass with a refractive index of 1.8 or more can be divided into three types: high dispersion glass having an Abbé number of 25 or less, medium dispersion glass with an Abbé number of 25 to 35, and low dispersion glass with an Abbé number of 35 or more. Conventionally, medium dispersion glass with an Abbé number of 25 to 35 that contains lead is known. However, due to concern for the environment and humans, the following glasses that achieve the above-stated optical characteristics without the incorporation of lead have been proposed in recent years.

For example, Japanese Unexamined Patent Publication (KOKAI) Showa No. 62-275038, which is expressly incorporated herein by reference in its entirety, discloses a glass having a refractive index nd of 1.8 to 1.85, an Abbé number v(nu)d of 31 to 32, and a specific gravity of 3.0 to 3.7 that is desirable for use in eyeglasses.

Japanese Unexamined Patent Publication (KOKAI) Heisei No. 7-41334, which is expressly incorporated herein by reference in its entirety, discloses a glass with a refractive index of 1.84 to 1.93, an Abbé number nud of 25 to 32, and a specific gravity of 4.0 or less.

Japanese Unexamined Patent Publication (KOKAI) No. 2000-128570, which is expressly incorporated herein by reference in its entirety, discloses a glass having a refractive index of 1.84 or above and a specific gravity of 3.9 or less.

Japanese Unexamined Patent Publication (KOKAI) No. 2004-175632, or English language family member U.S. patent application No. 2004-220041 AA, which are expressly incorporated herein by reference in their entirety, discloses a glass having a refractive index of 1.70 to 1.93 and an Abbé number nud of 28 to 45.

In the manufacturing of high-quality optical elements in which glass is softened by heating, when the glass serving as starting material does not melt readily, requiring that the melting temperature be raised, the platinum comprising the melting container ends up melting into the glass, discoloring the glass.

Further, when molding glass with low devitrification stability while in a molten state, the glass ends up devitrifying as the glass melt is quenched. Further, when devitrification stability is only good during molding of the glass melt and the molded glass is subsequently employed as a material, being reheated and melted during molding, low devitrification stability causes the molded product to devitrify.

Thus, obtaining a high-quality optical element requires the use, from melting to manufacturing of the optical element, of a glass that simultaneously satisfies the requirements of meltability, devitrification stability when molding glass in a molten state, low coloration, and devitrification stability in molded glass that has been softened by heating.

The glasses disclosed in the above-mentioned four patent publications are characterized by not containing Harmful Pb. However, the glasses have drawbacks that they do not satisfy simultaneously the requirements of meltability, devitrification stability when molding glass in a molten state, low coloration, and devitrification stability in molded glass that has been softened by heating. Further, the various above-described glasses all contain an essential component in the form of $TiO_2$, and thus present the problem of increased coloration, which is thought to be the result of titanium ions generated by high temperature melting.

SUMMARY OF THE INVENTION

Under these circumstances, the present invention has for its object to provide an optical glass having high refractivity and medium dispersion characteristics that simultaneously satisfies the requirements of meltability, devitrification stability when molding glass in a molten state, low coloration, and devitrification stability when molding glass that has been softened by heating; optical elements comprised of this glass; and a method for manufacturing such optical elements.

The present invention provides an optical glass that possesses meltability, devitrification stability when molding glass in a molten state, low coloration, and devitrification stability when molding glass that has been softened by heating. It further provides high-quality optical elements comprised of this optical glass.

DESCRIPTIONS OF THE EMBODIMENTS

The following preferred specific embodiments are, therefore, to be construed as merely illustrative, and not limitative of the remainder of the disclosure in any way whatsoever. In this regard, no attempt is made to show structural details of the present invention in more detail than is necessary for the fundamental understanding of the present invention, the description making apparent to those skilled in the art how the several forms of the present invention may be embodied in practice.

The present invention is described in greater detail below.

[Optical Glass]

The optical glass of the present invention comprises, denoted as weight percentages:

| | |
|---|---|
| $SiO_2$ | 2-22% |
| $B_2O_3$ | 3-24% |
| ZnO | >8% and ≦30% |
| CaO + BaO + ZnO | 10-50% |
| MgO | 0-3% |
| $La_2O_3 + Y_2O_3 + Gd_2O_3 + Yb_2O_3$ | 1-33% |
| $TiO_2$ | 2-20% |
| $ZrO_2$ | 0-10% |
| $Nb_2O_5$ | 2-32% |
| $Li_2O$ | 0-5% |
| $Na_2O$ | 0-8% |
| $K_2O$ | 0-10% |
| $WO_3$ | 0-20%. |

Further, the ratio by weight of $La_2O_3$ to the combined contents of $La_2O_3$, $Y_2O_3$, $Gd_2O_3$, and $Yb_2O_3$ ($La_2O_3/(La_2O_3+Y_2O_3+Gd_2O_3+Yb_2O_3)$) falls within a range of 0.7 to 1.

The optical glass of the present invention incorporates $SiO_2$ and $B_2O_3$, which are basic components of glass; ZnO, which has the effects of enhancing meltability and decreasing the molding temperature; and components to impart a high refractive rate. Rare earth oxides, TiO2, and $Nb_2O_5$ are incorporated as components imparting a high refractive index to achieve desired dispersion. Rare earth oxides have the effects of enhancing chemical durability and imparting a high refractive index without coloring the glass. $TiO_2$ and $Nb_2O_5$ both increase dispersion to within the desired range. The incorporation of $TiO_2$ alone increases coloration of the glass, so $Nb_2O_5$ is incorporated as an essential component. The incorporation of a suitable quantity of $Nb_2O_5$ has the effect of increasing devitrification stability. The point is that which rare earth oxide is to be employed to increase devitrification stability during reheating of the glass to soften it for molding. That is, when the quantity of rare earth oxide that is incorporated is comprised largely of $Y_2O_3$ or $Yb_2O_3$, devitrification stability decreases and starting material costs end up climbing. The cost also climbs when a large amount of $Gd_2O_3$ is employed, resulting in greater production costs for the glass and thus the optical elements. The present invention cuts costs and improves devitrification stability by employing a larger proportion of $La_2O_3$ in the rare earth oxide incorporated.

Based on this principle, the optical glass of the present invention further comprises optional components and balances the quantities of components to simultaneously satisfy the requirements of meltability, devitrification stability when molding glass in a molten state, low coloration, and devitrification stability in molded glass that has been softened by heating. The present invention was devised on this basis.

The composition of the optical glass of the present invention will be described in detail next. Unless specifically stated otherwise, contents and combined contents are given as weight percentages and the ratios of various components as weight ratios.

$SiO_2$ is a basic component of glass that has the effects of enhancing chemical durability, mechanical strength, thermal stability, devitrification stability, and melt viscosity. It also functions to increase the difference (Tx−Tg) of the glass transition temperature (Tg), which is an indicator of devitrification during reheating for molding, and the peak crystallization temperature (Tx). Resistance to devitrification decreases at an $SiO_2$ content of less than 2 percent, and the refractive index drops excessively at a content exceeding 22 percent. Accordingly, the $SiO_2$ content in the optical glass of the present invention is set to 2 to 22 percent, desirably 3 to 22 percent, preferably 4 to 22 percent, more preferably more than 10 percent but not more than 22 percent, still more preferably 11 to 22 percent, even more preferably 11 to 20 percent, and most preferably, a range of 11 to 19 percent.

In glasses in which the temperature differential (Tx−Tg) is large, the temperature range at which crystallization occurs is far removed from the lower limit of the temperature range at which press molding is possible. Thus, the temperatures at which the glass exhibits a viscosity permitting press molding are adequately lower than the temperature range at which crystallization occurs, and heating during press molding tends not to cause devitrification. Conversely, in glasses in which the temperature differential is small, the temperatures at which the glass exhibits a viscosity permitting press molding approach or overlap the temperature range at which crystallization occurs. Thus, heating during press molding tends to devitrify the glass.

To ensure devitrification stability when reheating glass for molding in this manner, glasses in which the temperature differential (Tx−Tg) is greater than 150° C. are desirable, glasses in which the temperature differential is 160° C. or greater are preferred, glasses in which the temperature differential is 165° C. or greater are of even greater preference, and glasses in which the temperature differential is 170° C. or greater are of still greater preference. The glass transition temperature (Tg) of the optical glass of the present invention is desirably 600° C. or less and preferably 580° C. or less. The peak crystallization temperature (Tx) is desirably 720° C. or greater, preferably 730° C. or greater. The lower limit of the glass transition temperature (Tg) is not specifically limited. However, by way of example, a yardstick of 450° C. can be employed. Nor is the upper limit of the peak crystallization temperature (Tx) specifically limited. However, by way of example, a yardstick of 880° C. can be employed.

$B_2O_3$ is a basic component of glass that has the effects of lowering the glass transition temperature and increasing meltability. A content of less than 3 percent results in deterioration of meltability and a tendency for the glass to devitrify. A content exceeding 24 percent makes it difficult to impart a high refractive index to the glass. Further, the melt viscosity sometimes decreases, rendering molding difficult. Accordingly, the content of $B_2O_3$ is set to 3 to 24 percent, preferably 4 to 22 percent, and still more preferably, a range of 5 to 21 percent.

ZnO is a useful component for increasing the meltability of the glass. Further, it lowers the press molding temperature, preventing deterioration of the pressing mold. It can also be anticipated to have the effect of ensuring a temperature differential (Tx−Tg). At less than or equal to 8 percent, it does not produce an adequate effect. At greater than 30 percent, devitrification stability is lost. Accordingly, the quantity of ZnO is set to greater than 8 percent and less than or equal to 30 percent, desirably 8.5 to 30 percent, preferably 9 to 28 percent, more preferably 9 to 27 percent, and still more preferably, 10 to 27 percent.

CaO and BaO have effects similar to that of ZnO in enhancing meltability. However, when the combined content of CaO, BaO, and ZnO is less than 10 percent, an adequate effect is precluded. At greater than 50 percent, the melt viscosity sometimes decreases and devitrification stability is sometimes lost. Accordingly, the combined content of CaO, BaO, and ZnO is set to 10 to 50 percent, desirably 12 to 48 percent, and preferably a range of 14 to 46 percent.

Of the above divalent components, the incorporation of ZnO has the greatest effect. With the incorporation of ZnO, the drop in melting temperature accompanying the increase in meltability and the increase in moldability when reheated due to the increase in the temperature differential (Tx−Tg) make it possible to anticipate the effects of reduced problems in melting and molding. Further, the incorporation of ZnO can greatly lower the glass transition temperature, thereby yielding a glass suited to precision press molding (also known as mold pressing).

CaO has the effects of reducing the specific gravity of the glass and increasing chemical durability. However, the introduction of a large amount of CaO sometimes compromises meltability and results in a loss of devitrification stability. Further, it sometimes reduces the temperature differential (Tx−Tg). The CaO content range is desirably 0 to 10 percent, preferably 0.1 to 8 percent, more preferably 0.1 to 6 percent, and still more preferably, 0.1 to 4 percent.

BaO has the effects of functioning as a flux, enhancing devitrification stability, and raising the refractive index without coloring the glass. However, the incorporation of BaO sometimes compromises chemical durability, even ending up reducing the temperature differential (Tx−Tg). The BaO content range is desirably 0 to 30 percent, preferably 0 to 24 percent, more preferably 1 to 24 percent, and still more preferably, 3 to 22 percent.

When controlling the temperature differential (Tx−Tg) by means of the ZnO and BaO contents, the ratio of the BaO content to the ZnO content (BaO/ZnO) is desirably less than 1, preferably 0.9 or less, more preferably 0.8 or less, and still more preferably, 0.75 or less.

MgO has the effect of reducing the specific gravity of the glass in the same manner as CaO. However, the incorporation of a large quantity of MgO reduces meltability and compromises devitrification stability. It also decreases the temperature differential (Tx−Tg). Accordingly, the MgO content is set to 0 to 3 percent, desirably 0 to 2 percent, preferably 0 to 1 percent, and still more preferably, none at all.

$La_2O_3$, $Y_2O_3$, $Gd_2O_3$, and $Yb_2O_3$ have the effects of enhancing the chemical durability of the glass and raising the refractive index without coloring the glass. At a combined content of $La_2O_3$, $Y_2O_3$, $Gd_2O_3$, and $Yb_2O_3$ of less than 1 percent, these effects are difficult to achieve. At greater than 33 percent, meltability and devitrification stability decrease and the temperature differential (Tx−Tg) diminishes. Accordingly, the combined content is set to 1 to 33 percent. The preferred combined content range of $La_2O_3$, $Y_2O_3$, $Gd_2O_3$, and $Yb_2O_3$ is 1 to 30 percent, more preferably 2 to 30 percent, even more preferably 3 to 30 percent, and still more preferably, 3 to 28 percent.

As set forth above, $Y_2O_3$ and $Yb_2O_3$ have the greatest tendency to reduce the temperature differential (Tx−Tg) among $La_2O_3$, $Y_2O_3$, $Gd_2O_3$, and $Yb_2O_3$. Since $Gd_2O_3$, $Y_2O_3$, and $Yb_2O_3$ are more expensive starting materials than $La_2O_3$, a greater proportion of $La_2O_3$ can be employed among $La_2O_3$, $Y_2O_3$, $Gd_2O_3$, and $Yb_2O_3$ to reduce the cost. From this perspective, the ratio of the $La_2O_3$ content to the combined content of $La_2O_3$, $Y_2O_3$, $Gd_2O_3$, and $Yb_2O_3$ ($La_2O_3/(La_2O_3+Y_2O_3+Gd_2O_3+Yb_2O_3)$) is set to 0.7 to 1, desirably 0.8 to 1, preferably 0.85 to 1, and more preferably, a range of 0.9 to 1. The incorporation of $La_2O_3$ alone among the above-described rare earth oxides is particularly desirable.

The content of $La_2O_3$ desirably falls within a range of 1 to 33 percent, preferably a range of 1 to 30 percent, more preferably a range of 2 to 28 percent, and still more preferably, a range of 3 to 28 percent.

Reducing the combined quantity of these rare earth oxides is advantageous for increasing the temperature differential (Tx−Tg). Thus, when employing the above method to achieve a temperature differential greater than a prescribed value, the combined content of $La_2O_3$, $Y_2O_3$, $Gd_2O_3$, and $Yb_2O_3$ is desirably greater than or equal to 1 percent but less than 10 percent, preferably 1 to 9.5 percent, more preferably 1 to 9 percent, further more preferably 2 to 9 percent, and still more preferably, 3 to 9 percent.

Since $TiO_2$ has the effects of raising the refractive index and increasing dispersion, it is incorporated in a proportion of 2 percent or more to obtain a medium-dispersion glass with a high refractive index. As the amount of $TiO_2$ added is increased, coloration tends to increase and meltability tends to drop. Thus, the content is set to no more than 20 percent. The $TiO_2$ content is desirably 3 to 20 percent, preferably 3 to 18 percent, and more preferably, 3 to 17 percent.

$Nb_2O_5$ has the effects of raising the refractive index, increasing dispersion, and enhancing devitrification stability. At a content of less than 2 percent, these effects are not achieved, and at greater than 32 percent, devitrification stability drops. Thus, the $Nb_2O_5$ content is set to 2 to 32 percent, desirably a range of 2 to 30 percent, preferably a range of 3 to 30 percent, and still more preferably, 3 to 29 percent.

To achieve desired optical characteristics while satisfying the above-stated requirements, the combined content of $TiO_2$ and $Nb_2O_5$ is desirably 5 percent or more. Further, the combined content is desirably kept to 40 percent or less to maintain good devitrification stability. The preferred range of the combined content of $TiO_2$ and $Nb_2O_5$ is 10 to 38 percent, preferably a range of 12 to 36 percent.

$Nb_2O_5$ has good affinity with ZnO. Thus, the use of a high quantity of ZnO permits the use of a high quantity of $Nb_2O_5$. Since good meltability and moldability can thus be achieved, and since $Nb_2O_5$ is advantageously employed instead of $TiO_2$ from the perspective of low coloration, glass with low coloration, a high refractive index, and low dispersion can be achieved.

$ZrO_2$ has the effects of raising the refractive index and increasing dispersion without coloring the glass. Effects such as stabilizing the glass, enhancing devitrification stability, and increasing the temperature differential (Tx−Tg) can also be anticipated. However, when the content exceeds 10 percent, meltability and devitrification stability deteriorate. Thus, the content is set to 0 to 10 percent, desirably 1 to 10 percent, preferably 1 to 9 percent, and more preferably, 1 to 8 percent.

In addition to the above-described components, optional components in the form of $Li_2O$, $Na_2O$, $K_2O$, and $WO_3$ can be incorporated into the optical glass of the present invention within prescribed ranges. These optional components will be described below.

$Li_2O$ is useful for increasing meltability and can be anticipated to have the effects of lowering the press molding temperature and preventing damage to the pressing mold. However, a content in excess of 5 percent sometimes compromises devitrification stability. Accordingly, the content of $Li_2O$ is set to 0 to 5 percent, desirably 0 to 4 percent, preferably 0 to 3 percent, and more preferably, 0 to 2 percent.

$Na_2O$ is useful for increasing meltability in the same manner as $Li_2O$, and can be anticipated to have the effects of lowering the press molding temperature and preventing damage to the pressing mold. However, a content in excess of 8 percent sometimes compromises devitrification stability. Accordingly, the content of $Na_2O$ is set to 0 to 8 percent, preferably 0 to 7 percent.

$K_2O$ is useful for increasing meltability in the same manner as $Li_2O$ and can be anticipated to have the effects of lowering the press molding temperature and preventing damage to the pressing mold. However, a content in excess of 10 percent sometimes compromises devitrification stability. Accordingly, the content of $K_2O$ is set to 0 to 10 percent, desirably 0 to 5 percent, preferably 0 to 2 percent, more preferably 0 to 1 percent, and still more preferably, none at all.

$WO_3$ has the effects of raising the refractive index, increasing dispersion, and increasing devitrification stability. However, a content in excess of 20 percent sometimes compromises devitrification stability. Further, the addition of $WO_3$ tends to decrease the temperature differential (Tx−Tg). Accordingly, the content of $WO_3$ is set to 0 to 20 percent, desirably 0 to 15 percent, preferably 0 to 12 percent, more preferably 0 to 11 percent, even more preferably 0 to 10 percent, and still more preferably, 0 to 5 percent.

Examples of composition ranges that fall within the above composition ranges and that are desirable for increasing the temperature differential (Tx−Tg) even further are given below.

In range 1, $SiO_2$ is incorporated in a proportion of more than 10 percent, preferably 11 percent or more, and the $WO_3$ content is limited to 15 percent or less, desirably 12 percent or less, and preferably 11 percent or less.

In range 2, the combined content of $La_2O_3$, $Y_2O_3$, $Gd_2O_3$, and $Yb_2O_3$ is limited to less than 10 percent, desirably 9.5 percent or less, and preferably 9 percent or less.

In range 3, the ratio of the BaO content to the ZnO content (BaO/ZnO) is limited to less than 1, desirably 0.9 or less, preferably 0.8 or less, and more preferably, 0.75 or less.

Glasses falling within ranges 1 and 2, glasses falling within ranges 2 and 3, glasses falling within ranges 1 and 3, and glasses falling within ranges 1 through 3 are desirable because they afford greater temperature differentials (Tx−Tg).

The optical glass of the present invention having the above-stated composition simultaneously satisfies the requirements of meltability, devitrification stability when molding glass in a molten state, low coloration, and devitrification stability in molded glass that has been softened by heating while having a high refractive index and low dispersion. The optical characteristics of the optical glass of the present invention are a refractive index (nd) of 1.80 to 1.95, for example; preferably 1.82 to 1.93; and an Abbé number (nud) of 25 to 35, for example; preferably 27 to 33.

The optical glass of the present invention can be manufactured by heating and melting glass starting materials. Oxides, hydroxides, carbonates, nitrates, and the like may be suitably employed as glass starting materials. These starting materials are weighed out in the desired ratios and mixed to obtain a blended starting material. This is then melted, clarified, and stirred at 1,200 to 1,400° C., for example, and homogenized to obtain a homogeneous glass melt free of bubbles and unmelted matter. The glass melt is molded and gradually cooled to obtain the optical glass of the present invention. Any known molding technique, such as cast molding, bar molding, or press molding, may be employed as the molding method. The molded glass is transferred into an annealing furnace that has been preheated to near the glass transition point and gradually cooled to room temperature. The glass obtained may be suitably cut, ground, and polished. As needed, the glass may be cut and hot pressed, or precise gobs may be prepared, heated, and precision press molded into aspherical lenses or the like.

[Optical Elements and Method for Manufacturing the Same]

The optical elements of the present invention are comprised of the optical glass of the present invention.

The method for manufacturing optical elements of the present invention comprises the step of molding a glass material comprised of the optical glass of the present invention while in a heat-softened state.

As set forth above, the optical glass of the present invention has the property of tending not to devitrify when softened by heating for molding, and is thus suitable as a glass material for hot molding. For example, the method of manufacturing optical element blanks by producing a glass material for press molding comprised of the optical glass of the present invention and press molding this glass material in a pressing mold while in a heat-softened state is a good method for mass producing optical element blanks without devitrifying the glass.

Further, the method of manufacturing optical glass elements by producing glass materials for precision press molding from the optical glass of the present invention and precision press molding these optical glass materials in a pressing mold while in a heat-softened state is a good method for mass producing optical elements such as aspherical lenses without devitrifying the glass. Examples of these optical elements are various lenses and prisms.

Glass materials comprised of the optical glass of the present invention can be press molded with multiple rotating rollers while in a heat-softened state to mold glass cylinders. The glass cylinders can then be sliced to prepare optical element blanks. As needed, the glass slices can be processed into glass materials for press molding.

The optical elements comprised of the optical glass of the present invention are particularly suitable for use as lenses in digital still cameras, digital video cameras, in cameras with replaceable lenses, and front and rear projectors. They are suited to spherical surface polishing, as well as to glass molding by aspherical surface pressing in precision tooled molds.

EXAMPLES

The present invention is further described below through embodiments. However, the present invention is not limited to the forms shown in the embodiment.

Examples 1 to 13, Comparative Examples 1 to 3

Starting materials such as oxides, hydroxides, carbonates, and nitrates were suitably weighed out to obtain the compositions indicated in Table 1. The blended starting materials were mixed and then melted in platinum crucibles. Each of the glasses was melted at 1,200 to 1,400° C. After stirring and clarifying the glasses, they were caused to flow out on an iron plate to form glass blocks. The glass blocks were transferred to a furnace that had been heated to close to the glass transition point and annealed to room temperature. Samples for various measurements were cut out of the glass blocks, and various physical properties were measured by the following methods.

(1) Refractive Index (nd) and Abbé Number (nud)

Measured based on Standard JOGIS-01 of the Japan Optical Glass Industrial Society.

(2) Degree of Coloration

Measured based on Standard JOGIS-02 of the Japan Optical Glass Industrial Society. Table 1 gives the coloration by λ (lambda) 70. Lambda 70 was measured by the following method in accordance with the above standard. First, glass samples 10 mm in thickness with two optically polished parallel surfaces were prepared. A measurement beam with an intensity $I_{in}$ was directed perpendicularly onto one of the two optically polished surfaces, and the intensity $I_{out}$ of the beam as it exited from the other optically polished surface was measured. The wavelength at which the external transmittance ($I_{out}/I_{in}$) in the visible range was 70 percent was adopted as lambda 70. In the visible range to the long wavelength side of lambda 70, the external transmittance exceeded 70 percent. When a sample 10 mm in thickness could not be prepared, it sufficed to measure the external transmittance at a prescribed thickness and convert the result to calculate lambda 70.

(3) Glass Transition Point (Tg)

Cylindrical glass samples 5 mm in diameter and 20 mm in length were prepared and measurement was conducted with a TMA 4000S thermomechanical analyzer made by Bruker AXS.

(4) Peak Crystallization Temperature (Tx)

Samples of glass that had been thoroughly pulverized in a mortar were prepared and measurements were made with a Thermo Plus 2/DSC8270 high-temperature differential scanning calorimeter made by Rigaku K. K. In differential scanning calorimetry, an absorption peak appeared as the sample was heated and a heat emission peak appeared with further heating. The point at which the heat emission peak began to appear was adopted as the peak crystallization temperature (Tx).

Differential scanning calorimetry yielded a differential scanning calorimetric curve (DSC curve), with temperature plotted on the X-axis and the level of heat emission/absorption of the sample plotted on the Y-axis. The intersection of the tangent at the point where the slope reached a maximum when a heat emission peak appeared from the baseline in the curve, and the baseline itself, was adopted as the peak crystallization temperature (Tx). In the Examples and comparative examples, measurements were taken at a rate of temperature increase of 10° C./minute up to 1,250° C.

(A) Manufacturing of Aspherical Lenses

The various glasses indicated in Table 1 were employed to produce gobs as glass materials for precision press molding. The gobs were heated and precision press molded in a pressing mold having molding surfaces that had been precision polished to prepare aspherical lenses. The precision press molding was conducted by known methods.

(B) Manufacturing Spherical Lenses

The various glasses indicated in Table 1 were employed to produce gobs as glass materials for press molding. The gobs were heated and press molded in a pressing mold to produce lens blanks resembling lenses in shape. The lens blanks were ground and polished to produce spherical lenses.

As indicated in Table 1, all of the glass of the embodiments exhibited a temperature differential (Tg–Tx) of 150° C. or above in addition to medium dispersion and high refractive indexes. To increase the temperature differential (Tx–Tg), the methods of (i) incorporating 10 percent of $SiO_2$, (ii) keeping the weight ratio of BaO/ZnO to less than 1, (iii) keeping the combined contents of $La_2O_3$, $Y_2O_3$, $Gd_2O_3$, and $Yb_2O_3$ to less than 10 percent, and (iv) keeping the content of $WO_3$ to less than or equal to 15 percent were combined in the various embodiments. Further, as indicated in Table 1, the glasses of the embodiments all had low lambda 70 values and little coloration.

Manufacturing of various optical elements without glass devitrification was possible by both methods (A) and (B) above using the glasses of the embodiments.

By contrast, the glass of Comparative Example 1 had a lambda 70 value that was higher than in any of the embodiments, and thus presented a problem in terms of coloration. Further, the temperature differential (Tx–Tg) was not adequately ensured; when glass materials for press molding were prepared from the various glasses, softened by heating, and press molded, the glass devitrified.

The glass of Comparative Example 2 exhibited numbers equivalent to those of the glasses of the embodiments with regard to coloration. However, the temperature differential (Tx–Tg) was reduced due to high contents of $La_2O_3$ and BaO, so that when glass materials for press molding were prepared from the glass, softened by heating, and press molded, the glass devitrified.

The glass of Comparative Example 3 exhibited both coloration and a glass transition point (Tg) that were equivalent to those of the embodiments, but the temperature differential (Tx–Tg) was low. As a result, when glass materials for press molding were prepared from the glass, softened by heating, and press molded, the glass devitrified.

TABLE 1

| | | Ex. 1 | Ex. 2 | Ex. 3 | Ex. 4 | Ex. 5 | Ex. 6 | Ex. 7 | Ex 8 |
|---|---|---|---|---|---|---|---|---|---|
| Glass Composition wt % | $SiO_2$ | 18.1 | 5.1 | 5.3 | 10.4 | 9.5 | 14.6 | 15.4 | 10.6 |
| | $B_2O_3$ | 6.4 | 18.9 | 19.8 | 13.1 | 13.3 | 8.6 | 9.1 | 13.6 |
| | MgO | 0.0 | 0.0 | 0.0 | 0.0 | 0.0 | 0.0 | 0.0 | 0.0 |
| | CaO | 0.4 | 0.0 | 0.8 | 4.4 | 3.9 | 0.0 | 0.4 | 0.2 |
| | BaO | 7.6 | 0.0 | 6.1 | 18.8 | 19.8 | 0.0 | 8.2 | 4.3 |
| | ZnO | 10.8 | 23.9 | 25.0 | 10.9 | 21.2 | 15.6 | 11.5 | 17.1 |
| | ΣRO | 18.8 | 23.9 | 31.9 | 34.1 | 44.9 | 15.6 | 20.1 | 41.3 |
| | BaO/ZnO | 0.70 | 0.0 | 0.24 | 1.72 | 0.93 | 0.0 | 0.71 | 0.25 |
| | $La_2O_3$ | 16.0 | 25.9 | 19.7 | 10.8 | 4.5 | 16.2 | 17.1 | 25.4 |
| | $Y_2O_3$ | 0.0 | 0.0 | 0.0 | 0.0 | 0.0 | 0.0 | 0.0 | 0.0 |
| | $Gd_2O_3$ | 0.0 | 0.0 | 0.0 | 0.0 | 0.0 | 0.0 | 0.0 | 0.0 |
| | $Yb_2O_3$ | 0.0 | 0.0 | 0.0 | 0.0 | 0.0 | 0.0 | 0.0 | 0.0 |
| | $ΣLn_2O_3$ | 16.0 | 25.9 | 19.7 | 10.8 | 4.5 | 16.2 | 17.1 | 25.4 |
| | $La_2O_3/ΣLn_2O_3$ | 1 | 1 | 1 | 1 | 1 | 1 | 1 | 1 |
| | $TiO_2$ | 7.6 | 4.4 | 7.2 | 11.4 | 8.5 | 11.1 | 16.2 | 9.9 |
| | $ZrO_2$ | 2.6 | 3.6 | 3.7 | 2.5 | 2.6 | 2.6 | 2.7 | 3.1 |
| | $Nb_2O_5$ | 22.7 | 10.2 | 7.1 | 10.6 | 16.7 | 9.3 | 10.7 | 8.8 |
| | $TiO_2 + Nb_2O_5$ | 30.3 | 14.6 | 14.3 | 22.0 | 25.2 | 20.4 | 26.9 | 18.7 |
| | $Li_2O$ | 0.0 | 0.0 | 0.0 | 0.0 | 0.0 | 0.0 | 0.0 | 0.0 |
| | $Na_2O$ | 5.8 | 0.0 | 0.0 | 0.0 | 0.0 | 5.9 | 6.2 | 3.3 |
| | $K_2O$ | 0.0 | 0.0 | 0.0 | 0.0 | 0.0 | 0.0 | 0.0 | 0.0 |
| | $WO_3$ | 2.0 | 8.0 | 5.3 | 7.1 | 0.0 | 16.1 | 2.5 | 3.7 |
| | Total | 100.0 | 100.0 | 100.0 | 100.0 | 100.0 | 100.0 | 100.0 | 100.0 |
| Properties | nd | 1.83 | 1.85 | 1.84 | 1.85 | 1.84 | 1.83 | 1.84 | 1.84 |
| | vd | 29.9 | 33.5 | 34.2 | 30.1 | 30.6 | 29.1 | 27.9 | 31.5 |
| | λ70 (nm) | 393 | 404 | 388 | 404 | 396 | 400 | 410 | 396 |
| | Tg (° C.) | 563 | 580 | 591 | 597 | 571 | 542 | 555 | 561 |
| | Tx-Tg (° C.) | 190 | 163 | 178 | 178 | 181 | 153 | 193 | 166 |

| | | Ex. 9 | Ex. 10 | Ex. 11 | Ex. 12 | Ex. 13 | C. Ex. 1 | C. Ex. 2 | C. Ex. 3 |
|---|---|---|---|---|---|---|---|---|---|
| Glass Composition wt % | $SiO_2$ | 9.3 | 11.7 | 14.5 | 14.5 | 14.5 | 4.0 | 8.8 | 6.6 |
| | $B_2O_3$ | 13.1 | 9.0 | 8.6 | 8.6 | 8.6 | 20.0 | 10.5 | 13.2 |
| | MgO | 0.0 | 0.0 | 0.0 | 0.0 | 0.0 | 0.0 | 0.0 | 0.0 |
| | CaO | 3.8 | 2.6 | 1.4 | 0.4 | 0.4 | 16.3 | 0.0 | 0.0 |
| | BaO | 16.6 | 8.1 | 11.8 | 7.7 | 7.7 | 0.0 | 25.9 | 21.9 |
| | ZnO | 20.9 | 11.4 | 9.7 | 10.9 | 10.9 | 0.0 | 0.0 | 7.2 |
| | ΣRO | 41.3 | 22.1 | 22.9 | 19.0 | 19.0 | 16.3 | 25.9 | 29.1 |
| | BaO/ZnO | 0.79 | 0.71 | 1.22 | 0.71 | 0.71 | — | — | 3.04 |

TABLE 1-continued

|  | | | | | | | | |
|---|---|---|---|---|---|---|---|---|
| | La$_2$O$_3$ | 4.5 | 21.0 | 18.0 | 16.2 | 16.1 | 26.5 | 39.9 | 19.0 |
| | Y$_2$O$_3$ | 0.0 | 0.0 | 0.0 | 0.0 | 0.0 | 0.0 | 0.0 | 0.0 |
| | Gd$_2$O$_3$ | 0.0 | 0.0 | 0.0 | 0.0 | 0.0 | 0.0 | 0.0 | 0.0 |
| | Yb$_2$O$_3$ | 0.0 | 0.0 | 0.0 | 0.0 | 0.0 | 0.0 | 0.0 | 0.0 |
| | ΣLn$_2$O$_3$ | 4.5 | 21.0 | 18.0 | 16.2 | 16.1 | 26.5 | 39.9 | 19.0 |
| | La$_2$O$_3$/ΣLn$_2$O$_3$ | 1 | 1 | 1 | 1 | 1 | 1 | 1 | 1 |
| | TiO$_2$ | 5.4 | 16.0 | 11.1 | 5.6 | 11.1 | 14.0 | 14.9 | 3.9 |
| | ZrO$_2$ | 2.6 | 7.6 | 1.9 | 2.6 | 2.6 | 5.2 | 0.0 | 5.7 |
| | Nb$_2$O$_5$ | 23.8 | 4.1 | 9.2 | 27.7 | 9.2 | 14.0 | 0.0 | 21.6 |
| | TiO$_2$ + Nb$_2$O$_5$ | 29.2 | 20.1 | 20.3 | 33.3 | 20.3 | 28.0 | 14.9 | 31.2 |
| | Li$_2$O | 0.0 | 0.0 | 1.7 | 0.0 | 2.8 | 0.0 | 0.0 | 0.0 |
| | Na$_2$O | 0.0 | 6.1 | 1.9 | 5.9 | 0.0 | 0.0 | 0.0 | 0.0 |
| | K$_2$O | 0.0 | 0.0 | 0.0 | 0.0 | 0.0 | 0.0 | 0.0 | 0.6 |
| | WO$_3$ | 0.0 | 2.4 | 10.2 | 0.0 | 16.1 | 0.0 | 0.0 | 0.3 |
| | Total | 100.0 | 100.0 | 100.0 | 100.0 | 100.0 | 100.0 | 100.0 | 100.0 |
| Properties | nd | 1.86 | 1.85 | 1.86 | 1.85 | 1.85 | 1.88 | 1.87 | 1.87 |
| | νd | 30.0 | 30.0 | 29.9 | 29.0 | 29.9 | 30.2 | 32.5 | 31.3 |
| | λ70 (nm) | 395 | 409 | 396 | 392 | 407 | 418 | 410 | 397 |
| | Tg (° C.) | 571 | 535 | 539 | 556 | 545 | 600 | 620 | 590 |
| | Tx-Tg (° C.) | 171 | 175 | 195 | 171 | 160 | 150 | 140 | 150 |

Note:
Ex.; Example,
C. Ex.; Comparative Example
ΣRO is total content of CaO, BaO and ZnO.
ΣLn$_2$O$_3$ is total content of La$_2$O$_3$, Y$_2$O$_3$, Gd$_2$O$_3$ and Yb$_2$O$_3$ The present invention provides optical elements suited for use as lenses in digital still cameras, digital video cameras, replaceable lens cameras, and front and rear projectors.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An optical glass comprises, denoted as weight percentages:

| | |
|---|---|
| SiO$_2$ | >10%->22% |
| B$_2$O$_3$ | 3.0%-24% |
| ZnO | >8.0% and <30% |
| CaO + BaO + ZnO | 10%-50% |
| MgO | 0-3% |
| La$_2$O$_3$ + Y$_2$O$_3$ + Gd$_2$O$_3$ + Yb$_2$O$_3$ | 1.0-33% |
| TiO$_2$ | 2.0-20% |
| ZrO$_2$ | 0-10% |
| Nb$_2$O$_5$ | 2.0-32% |
| Na$_2$O | 0-8% |
| K$_2$O | 0-10% |
| WO$_3$ | 2.0%-20%; |
| CaO | 0-4.4%; and | ratio by weight of La$_2$O$_3$ to combined contents of La$_2$O$_3$, Y$_2$O$_3$, Gd$_2$O$_3$, and Yb$_2$O$_3$ (La$_2$O$_3$/(La$_2$O$_3$+Y$_2$O$_3$+Gd$_2$O$_3$+Yb$_2$O$_3$)) falls within a range of 0.8 to 1,
wherein the optical glass contains no Pb and no Li$_2$O, and
wherein the glass exhibits a refractive index (nd) in a range of 1.80 to 1.95 and an Abbé number ($v_d$) in a range of 25 to 35.

2. An optical element comprised of the optical glass according to claim 1.

3. A method of manufacturing an optical element comprising molding a glass material comprised of the optical glass according to claim 1 in a heat-softened state.

4. The optical glass as claimed in claim 1, wherein the glass comprises BaO satisfying the weight range of BaO/ZnO<1.0.

5. An optical element comprised of the optical glass according to claim 4.

6. A method of manufacturing an optical element comprising molding a glass material comprised of the optical glass according to claim 4 in a heat-softened state.

* * * * *